US012560456B2

(12) United States Patent
Abid et al.

(10) Patent No.:  US 12,560,456 B2
(45) Date of Patent:       Feb. 24, 2026

(54) METHOD FOR APPLYING CORRECTION TO SMART-METER INSTRUCTIONS

(71) Applicant: SAGEMCOM ENERGY & TELECOM SAS, Bois-Colombes (FR)

(72) Inventors: Oussama Abid, Bois-Colombes (FR); Abbas Sabraoui, Bois-Colombes (FR); Ahmet Samed Basturk, Bois-Colombes (FR)

(73) Assignee: SAGEMCOM ENERGY & TELECOM SAS, Bois-Colombes (FR)

( * ) Notice: Subject to any disclaimer, the term of this patent is extended or adjusted under 35 U.S.C. 154(b) by 0 days.

(21) Appl. No.: 18/740,447

(22) Filed: Jun. 11, 2024

(65) Prior Publication Data

US 2024/0410717 A1      Dec. 12, 2024

(30) Foreign Application Priority Data

Jun. 12, 2023      (FR) ...................................... 2305920

(51) Int. Cl.
G01D 4/00          (2006.01)
(52) U.S. Cl.
CPC ......... G01D 4/002 (2013.01); G01D 2204/22 (2021.05); G01D 2204/40 (2021.05); H04Q 2209/60 (2013.01)
(58) Field of Classification Search
CPC .......... G01D 4/00; G01D 4/002; G01D 4/004; G01D 4/008; G01D 2204/20; G01D 2204/40; G01D 2204/22; H04Q 2209/00; H04Q 2209/10; H04Q 2209/40; H04Q 2209/43; H04Q 2209/60; H04Q 2209/70;
(Continued)

(56) References Cited

U.S. PATENT DOCUMENTS 10,678,674 B2 *   6/2020   Hintsala .............. G06F 11/3656
11,477,547 B1 *  10/2022   Abdelrazek ............. H04L 67/55

FOREIGN PATENT DOCUMENTS

CN          112887423 A   *   6/2021   ........... H04L 67/025
EP           2275935 A2      1/2011

OTHER PUBLICATIONS

Dec. 12, 2023 Search Report issued in French Patent Application No. 2305920.

* cited by examiner

*Primary Examiner* — Franklin D Balseca
(74) *Attorney, Agent, or Firm* — Williams Mullen; R. Brian Drozd

(57)          ABSTRACT

Provided is a controller of a smart meter that includes a processor incorporating a debugging module configured to stop execution of instructions when a stop point is reached and to generate an associated hardware interrupt. For applying a correction to a set of instructions, the controller: receives a new-correction message that supplies the correction to be applied and a point of stopping application of the correction in the set of instructions executed by the controller; records correction instructions in non-volatile memory for future restarting of the smart meter, and in random access memory for the purpose of taking into account without restarting the smart meter; configures the debugging module with the point of stopping application of the correction; and applies on the fly the correction instructions of which are recorded in random access memory, when detecting a hardware interrupt associated with the point of stopping application of the correction.

9 Claims, 2 Drawing Sheets

(58) Field of Classification Search
CPC ........... H04Q 2209/80; H04Q 2209/84; H04Q
2209/86
See application file for complete search history.

101    D1    103    D2    102

I    C    110

140    B    M 130    120

201 — Startup

202 — Configuration of debugging module

203 — Correction service awaiting interrupt

204 — Detection of interrupt?

no yes

205 — Suspension of execution of main program

206 — Execution of correction instructions

207 — Resumption of main program

301

Startup

302

Correction service awaiting
new-correction message

303

Reception of message?          no yes

304

Recording in memory of instructions
corresponding to the new correction

305

Configuration of the debugging module

401 CPU

402 RAM

403 Flash

210 C

404 SM

405 I/f

410

METHOD FOR APPLYING CORRECTION TO SMART-METER INSTRUCTIONS

CROSS-REFERENCE TO RELATED APPLICATIONS

This application claims priority to French Application No. 2305920 filed on Jun. 12, 2023.

TECHNICAL FIELD

The present invention relates to applying a correction (also referred to as a "patch"), on the fly, to instructions executed by a smart meter. Applying a correction makes it possible to correct anomalies found in the instructions executed by the smart meter and/or to enhance operations performed by executing instructions by the smart meter.

PRIOR ART

At the present time, water, gas and electricity meters have become smart meters, i.e. they incorporate data processing operations and communication interfaces so as to be able to exchange with a centralised server. This centralised server makes it possible in particular to make readings of metering implemented by these smart meters. This centralised server also makes it possible in particular to implement software updates for these smart meters, in order to correct anomalies found in the instructions executed by the smart meter and/or to enhance operations performed by implementing instructions by the smart meter.

A software update (e.g. FOTA ("Firmware Over-The-Air")) is a particularly cumbersome series of operations. In particular, a complete new set of instructions (new software) must be supplied to each smart meter to be updated. A large quantity of data must be transmitted from the centralised server to each smart meter to be updated, which gives rise to a great consumption of network resources. In addition, when the smart meters are water or gas meters, these smart meters operate on a battery, so as to have an autonomous energy supply. However, such software update operations have a great impact on the life of the battery.

Furthermore, these software updates require restarting the smart meter once the new set of instructions is downloaded, so that this new set of instructions can be executed by a processor of said smart meter, which causes an interruption of service.

It is therefore desirable to overcome these drawbacks of the prior art by means of a solution that makes it possible in particular to apply a correction on the fly (without interruption of service).

DISCLOSURE OF THE INVENTION

A method is proposed here for applying a correction to a set of instructions executed by a controller of a smart meter, said smart meter being configured to communicate with a centralised server via a communication network, said controller comprising a processor incorporating a debugging module configured to stop execution of the instructions when it is detected that a stop point is reached and to generate an associated hardware interrupt, the method being implemented by said controller and comprising the following steps: receiving a new-correction message via said communication network, said message supplying the correction to be applied and a point of stopping application of the correction in the set of instructions executed by said controller; recording instructions of the correction supplied by said message in non-volatile memory with a view to a future restarting of the smart meter, as well as in random access memory with a view to taking into account on the fly, i.e. without restarting the smart meter; configuring the debugging module with said point of stopping application of the correction; and applying on the fly the correction the instructions of which are recorded in random access memory, when a hardware interrupt associated with said point of stopping application of the correction is detected. Thus it is possible to apply, on the fly, a correction to a set of instructions executed by a controller of a smart meter, and this correction will also be taken into account at any subsequent restarting of the smart meter. In addition, by proceeding in this way, the majority of the set of instructions can remain unchanged, which limits the consumption of network resources for transmitting/receiving the correction.

According to a particular embodiment, the correction is among the following corrections: a skip in relation to any instruction or set of instructions; a change of at least one function argument; a change of instruction-execution order; an addition of at least one instruction; a substitution of at least one instruction. Thus the method is adapted to a multitude of corrections.

According to a particular embodiment, the new-correction message comprises information that makes it possible to derive the instructions of the correction to be applied. Thus the message is of reduced size.

According to a particular embodiment, the correction to be applied is included in the new-correction message in the form of instructions in machine language. Thus complex corrections can be applied.

According to a particular embodiment, when the smart meter is started up, the controller performs the following steps: configuring the debugging module with any stop point for each correction possibly received previously; awaiting detection of any hardware interrupt corresponding to a said stop point; awaiting reception of any new-correction message. Thus each correction is taken into account on starting up, and new corrections can be received and incorporated on the fly.

A computer program is also proposed here, comprising program code instructions causing an implementation of the method, when said instructions are executed by a smart-meter processor. An information storage medium is also proposed here, storing such program code instructions.

A smart meter is also proposed here, configured to apply a correction to a set of instructions executed by a controller of a smart meter, said smart meter being configured to communicate with a centralised server via a communication network, the controller comprising a processor incorporating a debugging module configured to stop implementation of the instructions when it is detected that a stop point is reached and to generate an associated hardware interrupt, the controller being configured for: receiving a new-correction message via an interface of said smart meter with said communication network, said message supplying the correction to be applied and a point of stopping application of the correction in the set of instructions executed by said controller; recording instructions of the correction supplied by said message in non-volatile memory with a view to a future restarting of the smart meter, as well as in random access memory with a view to taking into account on the fly, i.e. without restarting the smart meter; configuring the debugging module with said point of stopping application of the correction; and applying on the fly the correction the instructions of which are recorded in random access memory, when a hardware interrupt associated with said point of stopping application of the correction is detected.

BRIEF DESCRIPTION OF THE DRAWINGS

The features of the invention mentioned above, as well as others, will emerge more clearly from the reading of the following description of at least one example embodiment, said description being made in relation to the accompanying drawings, among which:

FIG. 34 illustrates schematically an example of hardware arrangement of a smart-meter controller of the communication system.

DETAILED DISCLOSURE OF EMBODIMENTS

Figures 1, 2:
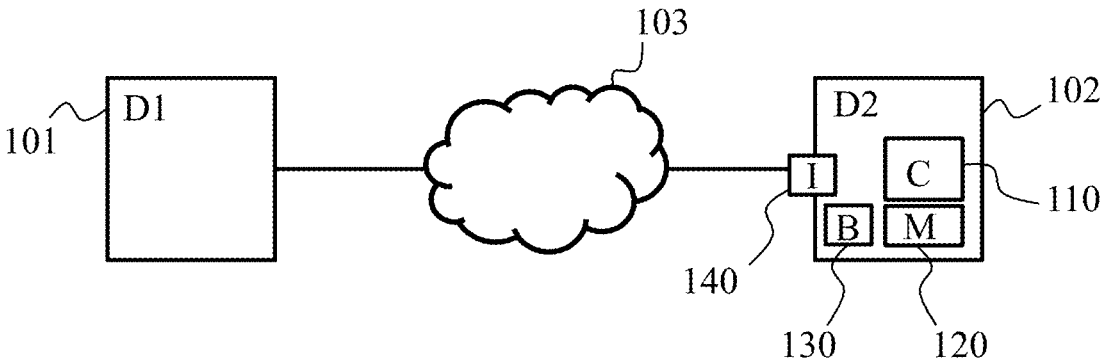
FIG. 1 illustrates schematically a communication system in which the present invention can be implemented.
FIG. 2 illustrates schematically an algorithm for applying a correction to a set of instructions executed by a smart meter of the communication system.

FIG. 1 illustrates schematically a communication system in which the present invention can be implemented.

The communication system comprises a first device D1 101 and a second device D2 102, connected by a communication network 103.

The second device D2 102 is a smart meter. For example, the second device D2 102 is an electricity meter. In a preferential embodiment, the second device D2 102 is a water or gas meter.

The first device D1 101 is adapted and configured to transmit, via the communication network 103, corrections to be applied to a set of instructions executed by the second device D2 102.

The first device D1 101 is typically connected to a multitude of smart meters via the communication network 103, in order to make it possible to implement software updates for said smart meters.

For example, when the second device D2 102 is a an electricity meter, the communication network 103 is a powerline communications (PLC) network and the first device D1 101 is a data concentrator (DC) or a computer system connected to such a data concentrator.

According to another example, when the second device D2 102 is a water or gas meter, the communication network 103 is a Low Power Wide Area Network (LPWAN), i.e. a long-range low-consumption wireless network as used in the Internet of Things (IoT), and the first device D1 101 is a gateway or a computer system connected to such a gateway.

To perform metering operations (water, gas, electricity consumption), the device D2 102 comprises a metrology module M 120. To communicate via the communication network 103 and more particularly with the device D1 101, the device D2 102 comprises a communication interface I 140. To perform data processing operations, such as for example to make consumption readings from metering operations of the metrology module M 120 and to form consumption statistics, the device D2 102 comprises a controller C 110. When the second device D2 102 is a water or gas meter, the device D2 102 comprises a battery B 130 for electrically supplying the second device D2 102. The battery B is typically calibrated to have a life of around fifteen or twenty years. Any heavy transfers of data via the communication interface I may be detrimental to this life (though the battery has been calibrated to allow a few of them), which the present invention aims to avoid.

FIG. 2 illustrates schematically an algorithm for applying a correction to a set of instructions executed by the device D2 102.

In a step 201, the device D2 102 is powered up and the device D2 102 implements a software start-up. The controller C 110 then copies into random access memory instructions stored in non-volatile memory. The controller C 110 reads instructions from the random access memory and executes them.

The instructions correspond to a main program and optionally to one or more corrections applied to the main program.

The controller C 110 includes a processor (for example of the ARM ("Advanced RISC (Reduced Instruction Set Computer) Machine" type) incorporating a debugging module configured to stop execution of the instructions when it is detected that a stop point is reached, and to generate an associated hardware interrupt. The hardware interrupt is then associated with correction instructions, which correspond to a routine for managing the interrupt in question that diverts the controller C 110 to a correction to be applied. The main program is suspended to apply the correction, as detailed hereinafter.

In a step 202, the device D2 102 configures the debugging module so that each correction previously received by the device D2 102 from the device D1 101 is taken into account. Thus a stop point is defined for each correction to be applied.

In a step 203, the device D2 102 activates its correction service and sets it to await detection of any hardware interrupt indicating that the execution of the instructions of the main program has reached a said stop point.

In a step 204, the device D2 102 checks whether such a hardware interrupt is detected. If such a hardware interrupt is detected, this typically means that a register (called program counter (PC)), which points to the address in random access memory of the next instruction to be executed, has reached said stop point. A step 205 is then performed. If not, the correction service remains awaiting detection of such a possible hardware interrupt, in the step 203.

In the step 205, the device D2 102 suspends execution of the main program and, in a step 206, the device D2 102 executes the instructions of the correction associated with the hardware interrupt detected. The value of the program counter (PC) register can be used to determine which correction is concerned.

It should be noted that, since access to the general-purpose registers (R0, . . . , Rn) is possible under interruption, numerous types of correction can be applied.

According to a first embodiment, the correction is an instruction skip or one relating to a set of instructions (code section). This is the case in particular when the instruction or set of instructions in question has been identified as unnecessary or incorrect. By way of example: a faulty manipulation of an input/output port of the GPIO ("General Purpose Input/Output") type, or an unnecessary activation of a peripheral, which causes overconsumption of energy. One possible correction then consists of changing the value of a register (called a link register (LR)) that points to the address in random access memory of a function return instruction, in accordance with the skip to be implemented. Another possible correction is incrementing the value of the program counter (PC) register, in accordance with the skip to be implemented.

According to a second embodiment, the correction is a change of at least one function argument. By way of example, a function of configuring an input/output port of the GPIO type uses a bad argument (e.g. GPIO-type input/output port number incorrect). One possible correction then consists of changing the value of one or more registers among general-purpose registers intended to store function arguments (often called (R0, . . . , Rn (with for example n=12)).

According to a third embodiment, the correction is a change of order of execution of instructions. By way of example, reconfiguring the state of an input/output port of the GPIO type must be done after having initialised it rather than the contrary. One possible correction then consists of listing the instructions in the correct order and changing the value of the link register (LR) to return to the main program at the instruction that follows the instructions that were wrongly ordered.

According to a fourth embodiment, the correction is an addition of at least one instruction. By way of example, inserting an initialisation of an input/output port of the GPIO type that was omitted in the main program. One possible correction then consists of providing instructions for initialising the/output port of the GPIO type in question without changing the value of the link register (LR).

According to a fifth embodiment, the correction is a substitution of instructions. By way of example: a rewriting of a complex function, or an introduction of new operations in a function. The correction instructions are then received in the form of a compiled binary function, i.e. directly instructions in machine language. The correction furthermore modifies the value of the link register (LR) to return to the main program at the instruction that follows the instructions that are the subject of the substitution.

Next, the correction service again awaits detection of any detection of a hardware interrupt indicating that the execution of the instructions of the main program has reached a said stop point, in the step 203.

Figure 3:
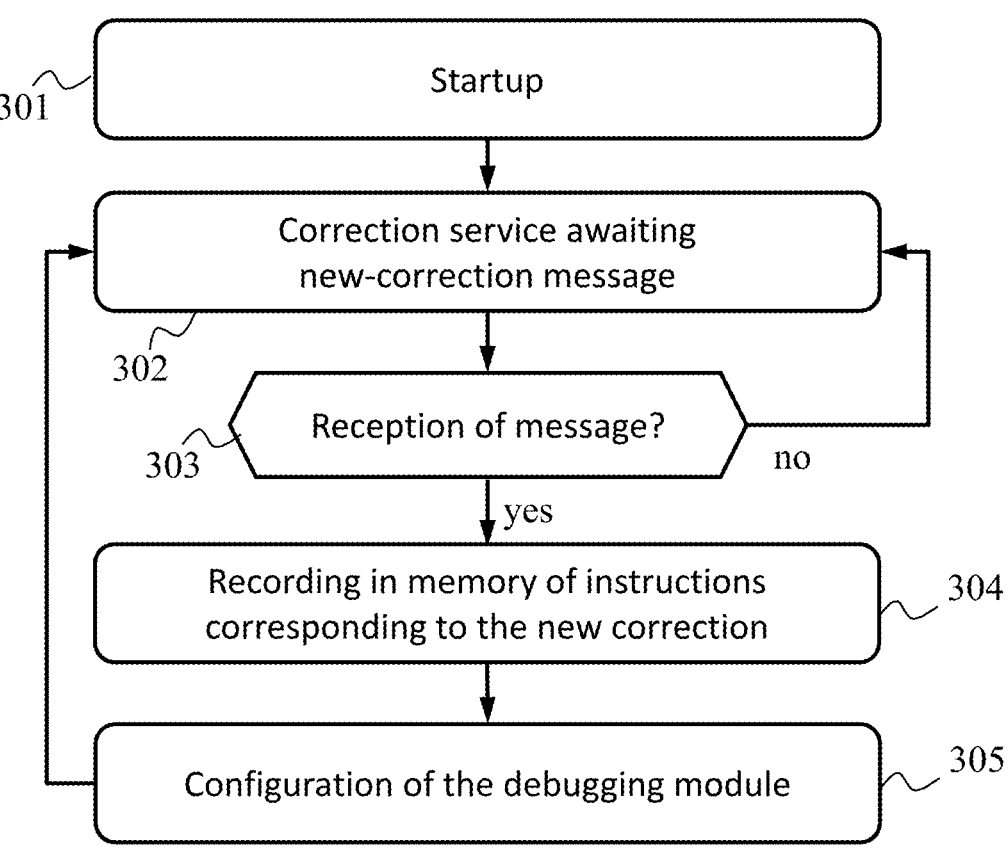
FIG. 3 illustrates schematically an algorithm for taking into account, on the fly, a correction to be applied to a set of instructions executed by a smart meter of the communication system.

FIG. 3 illustrates schematically an algorithm for taking into account, on the fly, a correction to be applied to a set of instructions executed by the device D2 102.

In a step 301, the device D2 102 is powered up and the device D2 102 implements a software start-up. The step 301 is the same as the step 201.

In a step 302, the device D2 102 activates its correction service (as at the step 203) and sets it to await detection of any reception of a new-correction message.

The new-correction message is a message that requests applying a correction to the main program. The new-correction message comprises a stop-point value to which the correction to be applied relates. In a particular embodiment, the message comprises information that make it possible to derive correction instructions to be applied, such as register values. This makes it possible to have reduced sizes (a few bytes) of new-correction messages, which is particularly advantageous when the transmissions from the device D1 101 to the device D2 102 have a small bandwidth (as is the case in networks of the LPWAN type). In a particular embodiment, the message comprises instructions in machine language corresponding to the correction to be applied. This makes it possible to easily transmit more complex corrections.

In a step 303, the device D2 102 checks whether such a new-correction message is received. If such is the case, a step 304 is performed; otherwise the correction service remains awaiting detection of possible reception of such a message, in the step 302.

In the step 304, the device D2 102 records in non-volatile memory instructions corresponding to the new correction. Thus, when the device D2 102 is next restarted, the correction is taken into account in the configuration of the debugging module (step 202). Furthermore, in the step 304, the device D2 102 records in random-access memory instructions corresponding to the new correction.

In a step 305, the device D2 102 configures the debugging module so that the correction newly received by the device D2 102 from the device D1 101 is taken into account. Thus a stop point is defined for this new correction to be applied. Recording the corresponding instructions in random access memory (step 304) enables the correction to be established on the fly, i.e. without having to restart the device D2 102.

Next, the correction service again awaits detection of possible reception of a new-correction message, in the step 302.

Figure 4:
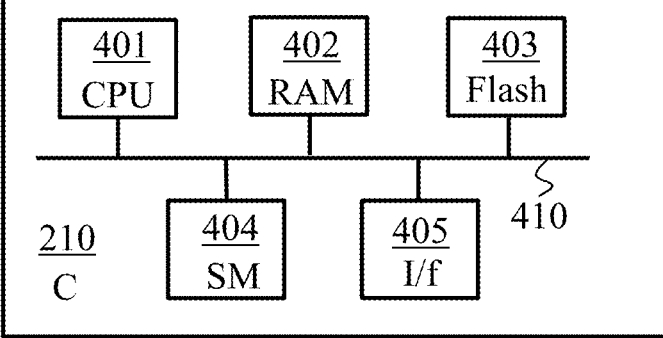

FIG. 4 illustrates schematically an example of arrangement of the controller C 110.

The controller C 110 comprises, connected by a communication bus 410: a processor or CPU ("central processing unit") 401; a random access memory (RAM) 402; a non-volatile memory, for example of the EEPROM ("electrically-erasable programmable read-only memory") type, or of the flash type 403; a storage unit, such as a storage medium SM 404, for example a hard disk HDD, or a storage medium reader, such as an SD (Secure Digital) card reader; and an interface manager I/f 405.

The processor or CPU 401 incorporates the debugging module used for generating hardware interrupts on previously defined stop points.

The interface manager I/f 405 enables the controller C 110 to interact with other elements of the device D2 102 (smart meter), in particular the metrology module M 120 and the communication interface I 140 (for receiving new-correction messages from the device D1 101).

The processor or CPU 401 is capable of executing instructions loaded in the random access memory 402 in particular from the non-volatile memory 303 or from the storage medium (such as an SD card) 304, or on reception of a new-correction message (as described in relation to FIG. 3). When the controller C 110 is powered up, the processor or CPU 401 is thus capable of reading instructions from the random access memory 302 and executing them. These instructions can be updated on the fly by applying a new correction, as already described. These instructions form a computer program causing in particular the implementation, by the processor or CPU 401, of the steps and behaviours described here.

The invention claimed is:

1. A method for applying a correction to a set of instructions executed by a controller of a smart meter, said smart meter being configured to communicate with a centralised server via a communication network, said controller comprising a processor incorporating a debugging module configured to stop execution of the set of instructions when it is detected that a stop point is reached and to generate an associated hardware interrupt, the method being implemented by said controller and comprising steps of:

receiving a new-correction message via said communication network, said message supplying the correction and a point of stopping application of the correction in the set of instructions executed by said controller;

recording instructions of the correction supplied by said message in non-volatile memory with a view to a future restarting of the smart meter, as well as in random access memory with a view that the smart meter will not be restarted;

configuring the debugging module with said point of stopping application of the correction; and applying on the fly the instructions of the correction recorded in the random access memory, when a hardware interrupt associated with said point of stopping application of the correction is detected.

2. The method according to claim 1, wherein the smart meter is a water or gas meter, and the communication network is of the LPWAN type.

3. The method according to claim 1, wherein the correction comprises:

a skip in relation to any instruction or set of instructions;

a change of at least one function argument;

a change of order of executing instructions;

an addition of at least one instruction; or a substitution of at least one instruction.

4. The method according to claim 1, wherein the new-correction message comprises information that makes it possible to derive the instructions of the correction.

5. The method according to claim 1, wherein the correction is included in the new-correction message in a form of instructions in machine language.

6. The method according to claim 1, wherein, when the smart meter is started up, the controller performs steps of:

configuring the debugging module with any stop point for each correction possibly received previously;

awaiting detection of any hardware interrupt corresponding to a stop point;

awaiting reception of any new-correction message.

7. A non-transitory information storage medium storing program code instructions causing implementation of a method according to claim 1, when said program code instructions are read and executed by the processor of the smart meter.

8. A smart meter configured to apply a correction to a set of instructions executed by a controller of the smart meter, said smart meter being configured to communicate with a centralised server via a communication network, the controller comprising a processor incorporating a debugging module configured to stop execution of the set of instructions when it is detected that a stop point is reached and to generate an associated hardware interrupt, the controller being configured for:

receiving a new-correction message via an interface of said smart meter with said communication network, said message supplying the correction and a point of stopping application of the correction in the set of instructions executed by said controller;

recording instructions of the correction supplied by said message in non-volatile memory with a view to a future restarting of the smart meter, as well as in random access memory with a view that the smart meter will not be restarted;

configuring the debugging module with said point of stopping application of the correction; and applying on the fly the instructions of the correction recorded in the random access memory, when a hardware interrupt associated with said point of stopping application of the correction is detected.

9. The smart meter according to claim 8, wherein the smart meter is a water or gas meter, and the communication network is of the LPWAN type.

\* \* \* \* \*